M. MENDEL.
SQUARE AND MITER ATTACHMENT FOR SAWS.
APPLICATION FILED MAR. 14, 1919.
1,338,188.
Patented Apr. 27, 1920.
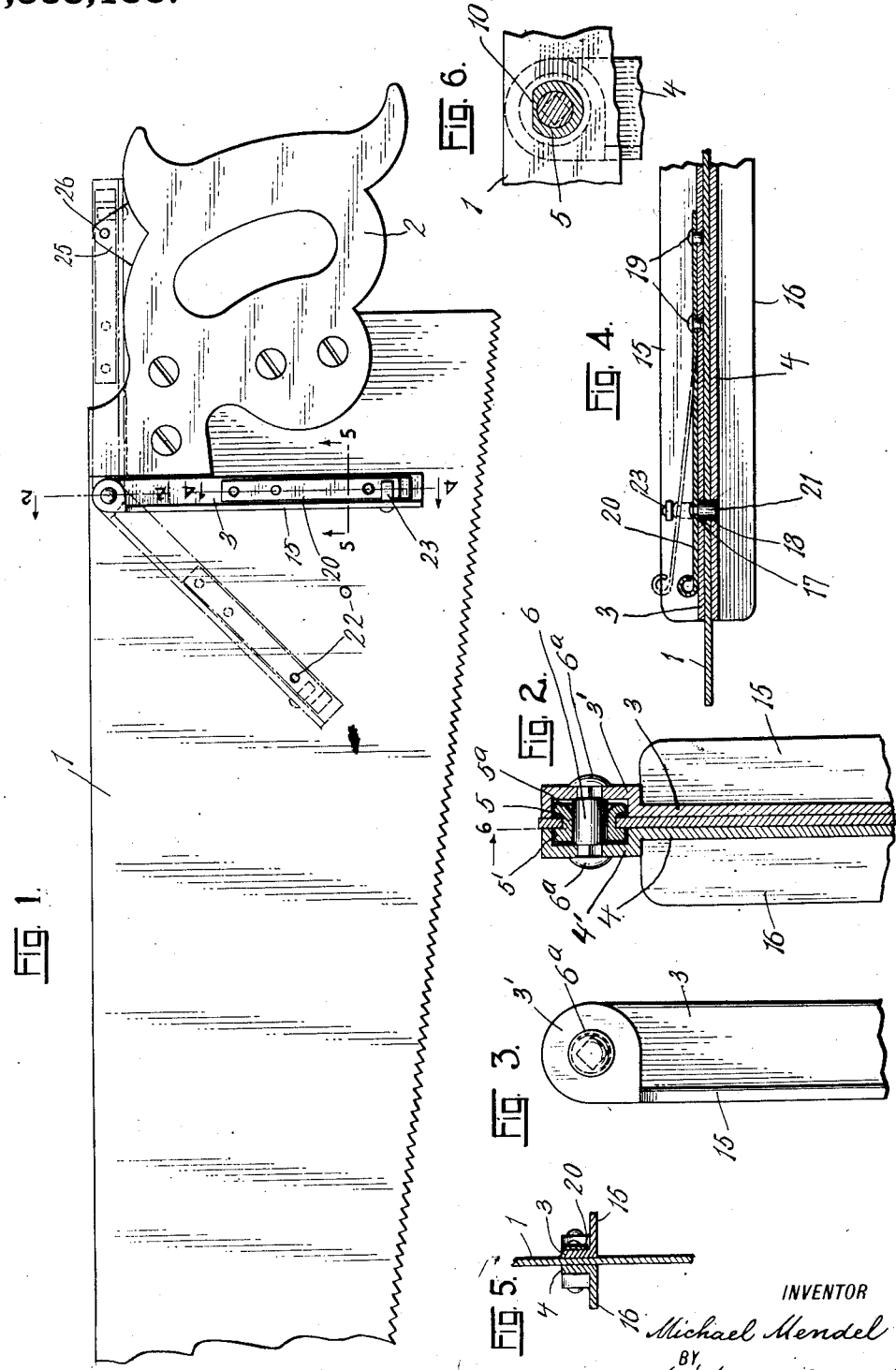

UNITED STATES PATENT OFFICE.

MICHAEL MENDEL, OF MIDDLE VILLAGE, NEW YORK.

SQUARE AND MITER ATTACHMENT FOR SAWS.

1,338,188.

Specification of Letters Patent.

Patented Apr. 27, 1920.

Application filed March 14, 1919. Serial No. 282,607.

*To all whom it may concern:*

Be it known that I, MICHAEL MENDEL, a subject of the King of England and Ireland, residing at Middle Village, county of Queens, and State of New York, have invented certain new and useful Improvements in Square and Miter Attachments for Saws, of which the following is a specification.

This invention relates to a square and miter attachment for saws such as the ordinary handsaws used by carpenters and other woodworkers, and it has for an object to provide a simple and easily operated attachment for saws which, in combination with the saw blade, enables lines to be laid out at desired angles on a piece of work.

A further object is to provide a device of this kind which will not interfere with the ordinary use of the saw nor be liable to be damaged itself, or damage the work during such use.

For further comprehension of the invention, and of the objects and advantages thereof, reference will be had to the following description and accompanying drawings, and to the appended claims in which the various novel features of the invention are more particularly set forth.

Figure 1 of the drawings is a side elevation of a handsaw having the invention applied thereto;

Fig. 2 is an enlarged fragmentary transverse section on the line 2—2 of Fig. 1;

Fig. 3 is a fragmentary view of one of the bars of the attachment;

Fig. 4 is a detail section on the line 4—4 of Fig. 1;

Fig. 5 is a detail section on the line 5—5 of Fig. 1; and,

Fig. 6 is a detail section on the line 6 of Fig. 2.

In the drawings 1 indicates the blade of a carpenter's handsaw of ordinary construction and 2 the handle thereof.

My improved square and miter attachment comprises a pair of bars 3 and 4 respectively attached to the saw blade on opposite sides thereof at a point near its rear edge and adjacent the handle 2, these bars being rigidly connected together but having a pivotal connection to the saw blade.

In the present instance this is effected by rigidly securing a bushing 5 in a suitable aperture in the blade and passing freely therethrough a pintle 6 having an enlarged central portion, being of a slightly greater length than the bushing, and whose opposite ends may be squared as shown; while the ends of said pintle are of a lesser diameter than the body thereof. The end of each of the bars 3 and 4 is pressed out as at 3' and 4' to provide inwardly facing recesses adapted to inclose the bushing, and these end portions 3' and 4' have squared openings formed therein, through which the ends of the pintle pass, these ends being then headed down as shown at 6ª.

The bushing 5 is here shown as having a flat wall 10 and the opening in the saw blade is formed in accordance (see Fig. 6), thus preventing rotary movement of the bushing in the blade. The bushing may be conveniently held in position by forming it with a flange 5' at one end before insertion in the blade, and then bending or flaring outwardly the other end as at 5ª over the edge of the opening in the blade.

It will be apparent that with this arrangement the bars 3 and 4 will be rigidly connected together and have a pivotal mounting on the saw blade.

These bars I prefer to make with outwardly projecting flanges 15 and 16 on the sides thereof which face toward the rear edge of the saw when the bars are extended forward longitudinally of the latter, and the bars are secured together so as to have these flanges in alinement as most clearly shown in Fig. 5.

These bars 3 and 4 have registering apertures 17 and 18 formed therein near the free ends thereof, and the bar 3 has riveted thereto as at 19 a flat spring 20 which carries an inwardly projecting stud 21 in position to engage in these apertures.

Formed in the saw blade at a proper distance from the pivot point of the bars to register with the apertures 17 and 18 are one or more apertures 22 which are arranged in the proper relation to cause the bars to extend at a desired angle to the back edge of the saw when the bars are set with the stud 21 passing through a selected one of these apertures. A finger 23 may be fixed to the flange 15 of bar 3 to limit the outward movement of the spring.

In the drawings I have shown the face flanges 15, 16 making a right angle with the back edge of the saw in full lines, and an angle of 45 degrees in broken lines. It will be obvious of course that any desired number of the these apertures 22 may be formed in the saw blade to permit of different angular setting of the attachment.

When not in use the attachment may be swung around against the handle to the position shown in dotted lines at the right if desired, and the handle may have fixed therein a fin 25 extending longitudinally along the saw adapted to project between the bars and having an aperture 26 to receive the stud 21 and hold the attachment in this position.

It will be apparent that when in this latter position the attachment will be completely out of the way and will be in no danger of striking the work in the event of an unusually long stroke of the saw.

It is believed that the manner of using my improved attachment will be apparent from the foregoing description, the fore end of spring 20 being lifted when it is desired to change the attachment from one position to another, the stud 21 dropping down in place when the attachment has been swung to the desired point and the spring released.

Having thus described my invention and set forth the manner of its construction, what I claim as new and desire to secure by Letters Patent is:—

1. The combination with a saw blade having an aperture therein, of a pair of bars disposed on opposite sides of the blade and having inwardly facing recesses, a bushing fixed in the said aperture and having its ends inclosed by the said recesses, and a pintle having an enlarged central portion passing freely through said bushing and of slightly greater length than the latter, said pintle having diminished ends to which the said bars are riveted, and means whereby said bars may be held in different angular positions upon the saw blade.

2. The combination with a saw blade having an aperture therein, of a pair of bars disposed on opposite sides of the blade and having inwardly facing recesses, a bushing fixed in the said aperture and having its ends inclosed by said recesses, means for preventing said bushing from turning in said saw blade, and a pintle having an enlarged central portion passing freely through said bushing and of slightly greater length than the latter, said pintle having diminished ends to which the said bars are riveted, and means whereby said bars may be held in different angular positions upon the saw blade.

3. The combination with a handsaw, of bars pivoted to the blade thereof at a point adjacent both the handle of the saw and the back edge of the blade by means of a pintle, a non-rotatable bushing through which said pintle freely passes; a stud for adjusting said bar in different angular positions on the sawblade, and means partly carried by the handle and partly constituted by the last-mentioned means for holding the bar in position extending longitudinally of the saw along one edge of the handle, said latter means having an aperture to receive said stud whereby the bars are held in longitudinal position.

4. The combination with a handsaw, of a pair of bars disposed on opposite sides of the saw, means rigidly connecting said bars together and pivotally to the saw, said bars having registering openings therein, a spring-pressed stud carried by one of said bars adapted to project into the said registering openings, and a fin carried by the handle of the saw in position to project between the said bars when the latter are swung to a position extending along the said handle, said fin having an aperture adapted to receive the said stud whereby the bars are held in the said position.

In testimony whereof I have affixed my signature.

MICHAEL MENDEL.